United States Patent [19]

Staar

[11] 3,884,566
[45] May 20, 1975

[54] TRANSPARENCY PROJECTOR HAVING A DEVICE TO ALLOW THE PLAYBACK OF SOUND RECORDINGS

[76] Inventor: Marcel Jules Helene Staar, 479 Avenue Louise, Brussels, Belgium

[22] Filed: Mar. 5, 1973

[21] Appl. No.: 338,402

Related U.S. Application Data

[63] Continuation of Ser. No. 35,961, May 11, 1970, abandoned.

[52] U.S. Cl.................................. 353/19; 353/120
[51] Int. Cl............................................. C03b 31/06
[58] Field of Search..................... 274/4 F; 353/15–19, 120

[56] References Cited
UNITED STATES PATENTS
3,408,139 10/1968 Schwartz............................. 353/117
3,592,975 7/1971 Ban ..................................... 274/4 F Primary Examiner—Richard E. Aegerter
Assistant Examiner—A. J. Mirabito

[57] ABSTRACT

An apparatus for use with transparency projectors to allow the playback of individual sound recordings each corresponding to a transparency, characterized in that in accordance with each compartment of the transparency magazine with which the projector is equipped there is disposed a ring or band of magnetisable material in a position such that when a particular transparency is projected, the individual recording associated therewith can be played back; the playback and recording apparatus is formed by a self-contained element or an assembly which can be integral with the projector or which, being detachable, can be fitted thereto, and is so disposed as to drive and read the recording ring or band which is associated with the transparency projected at that particular moment. (FIG. 13).

12 Claims, 24 Drawing Figures

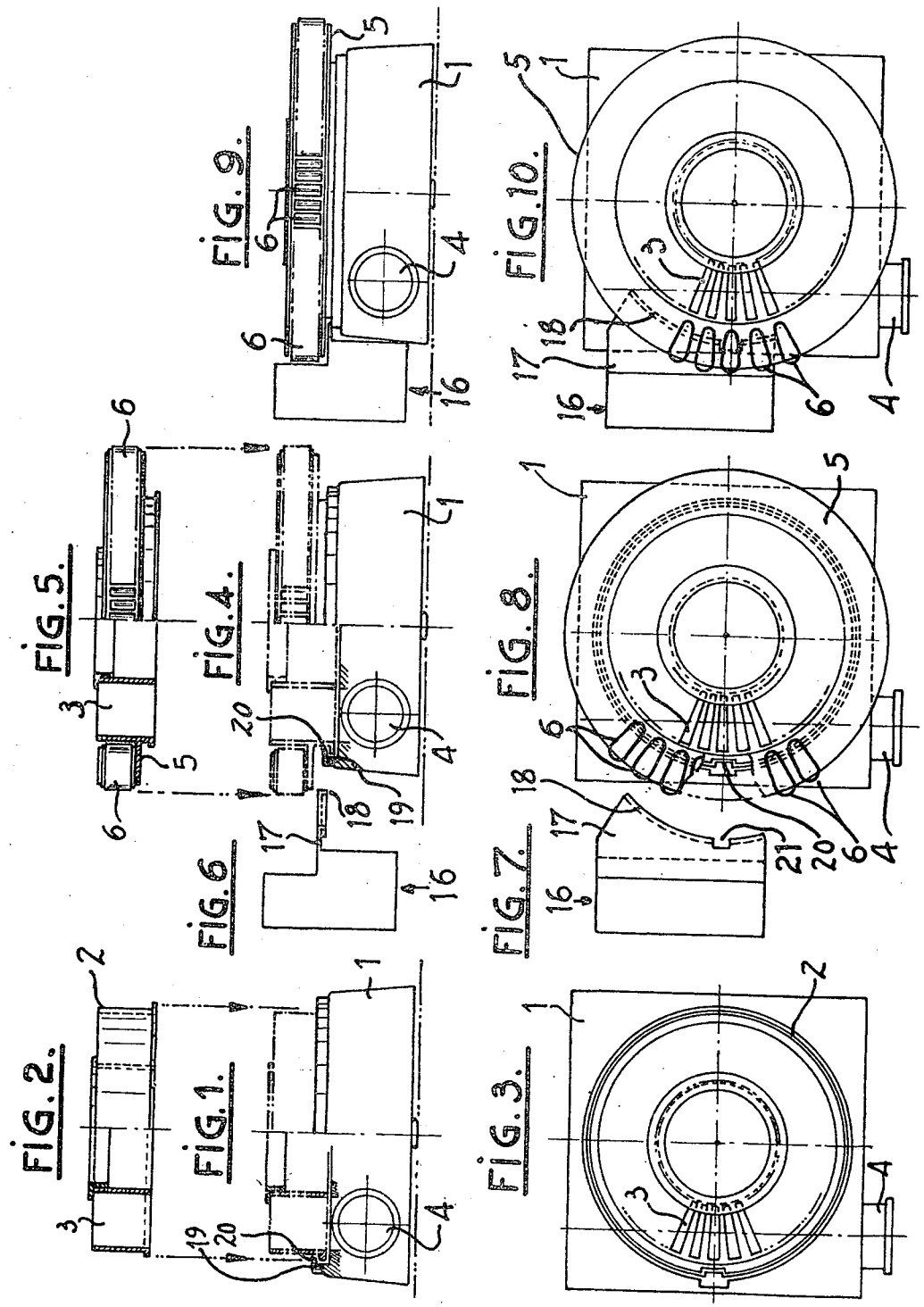

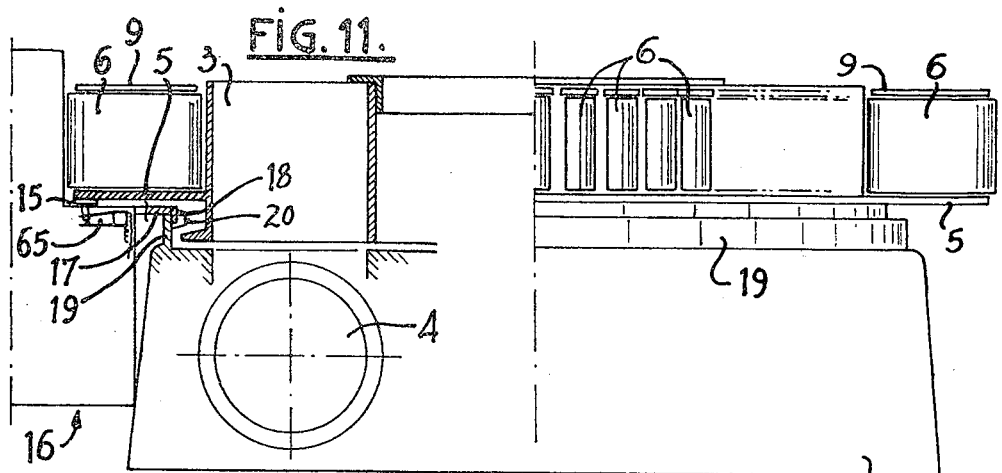
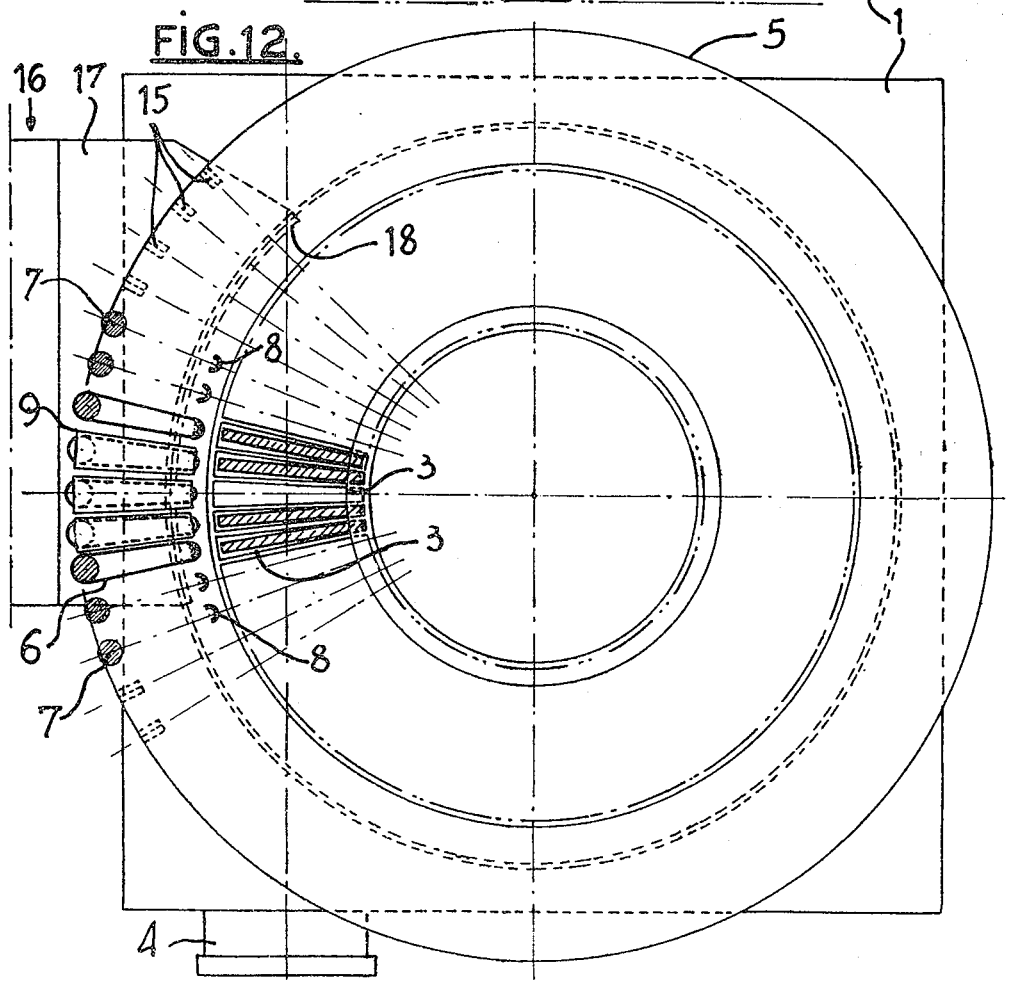

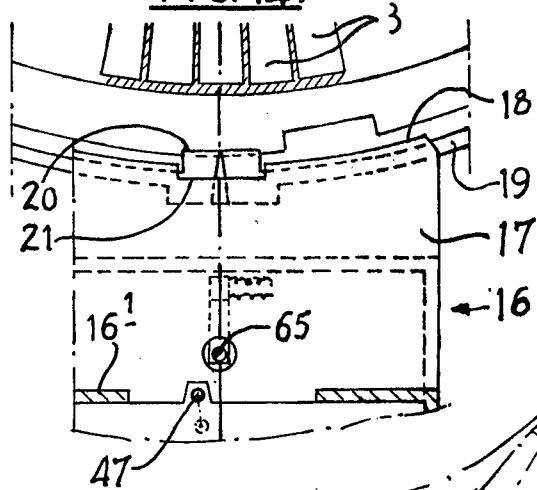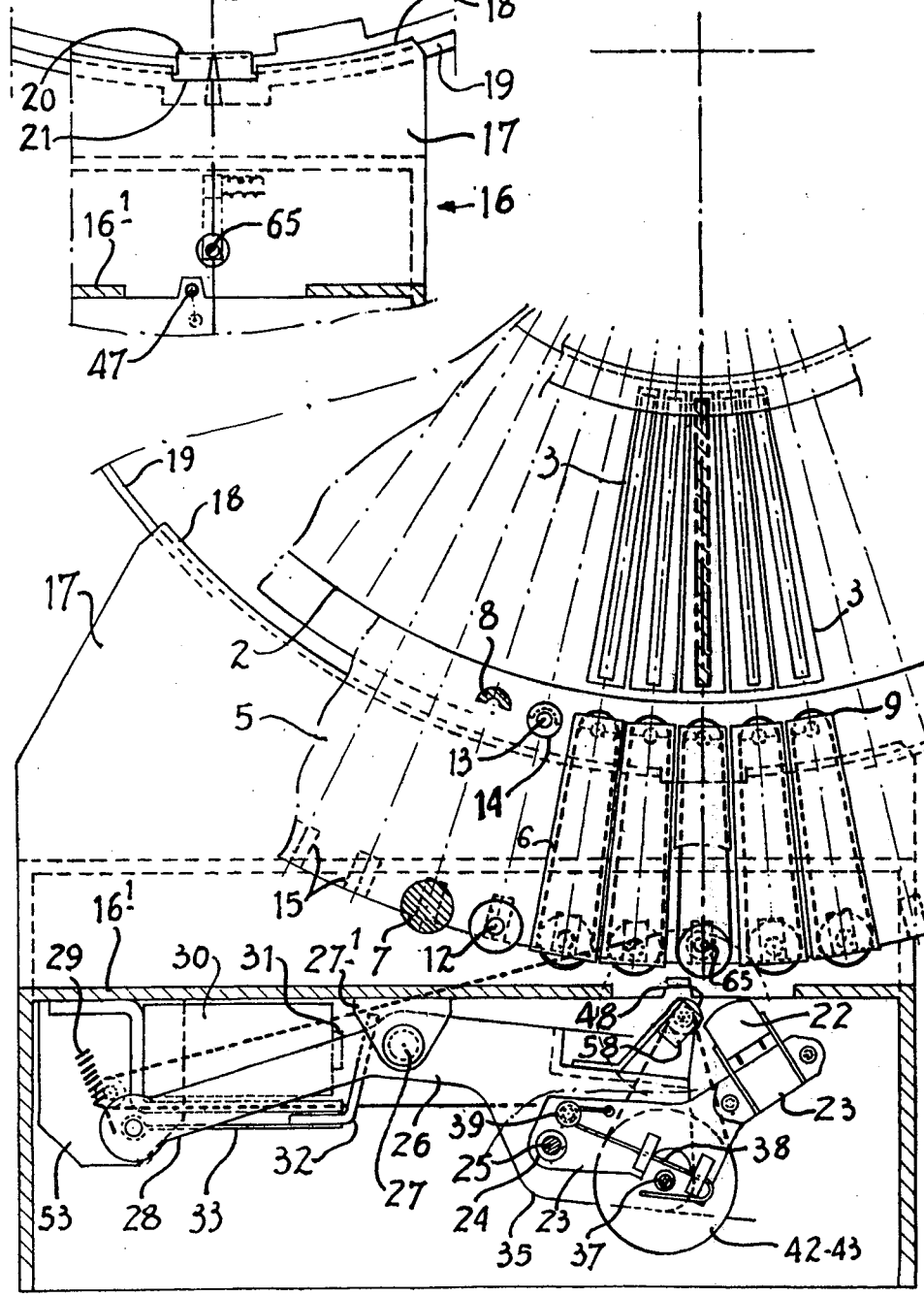

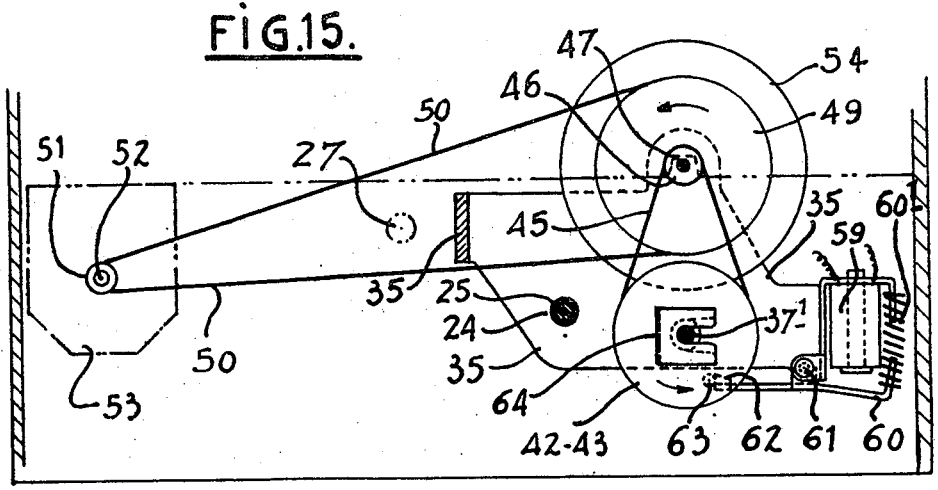
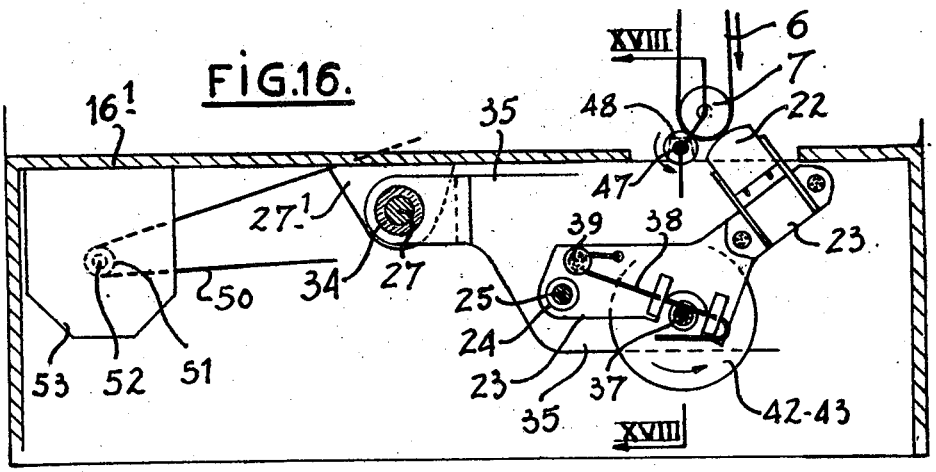
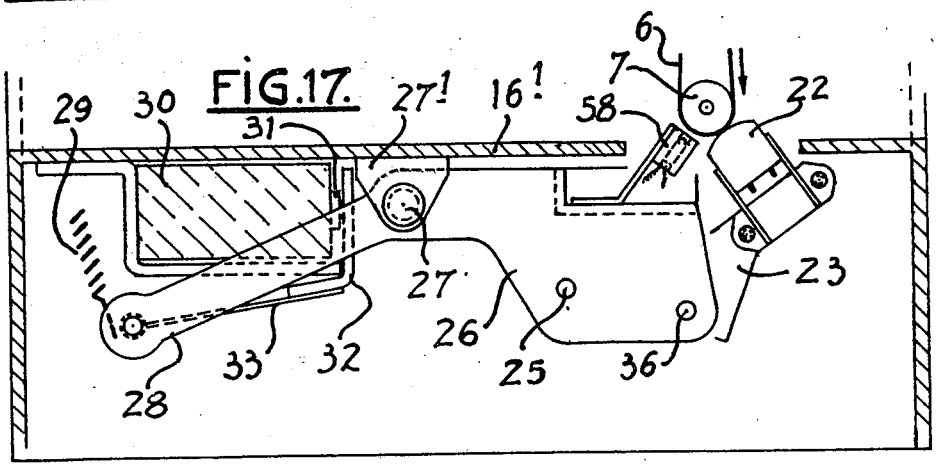

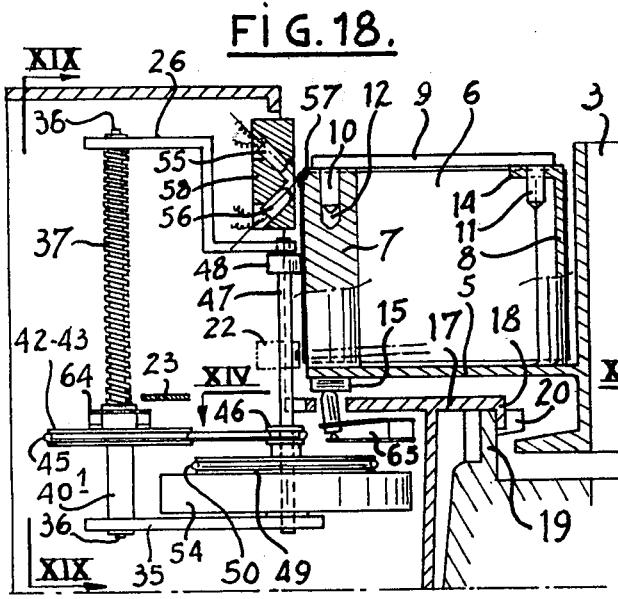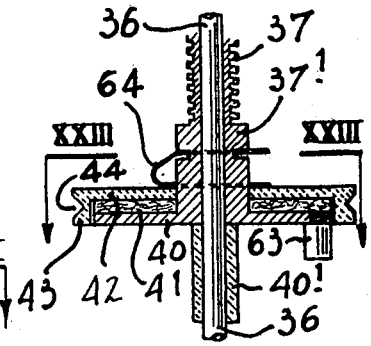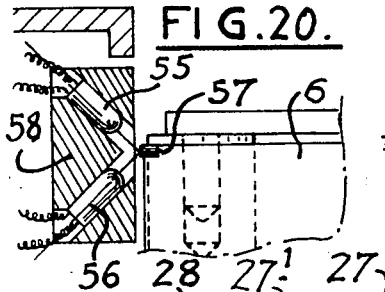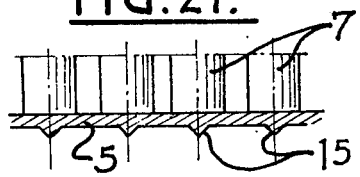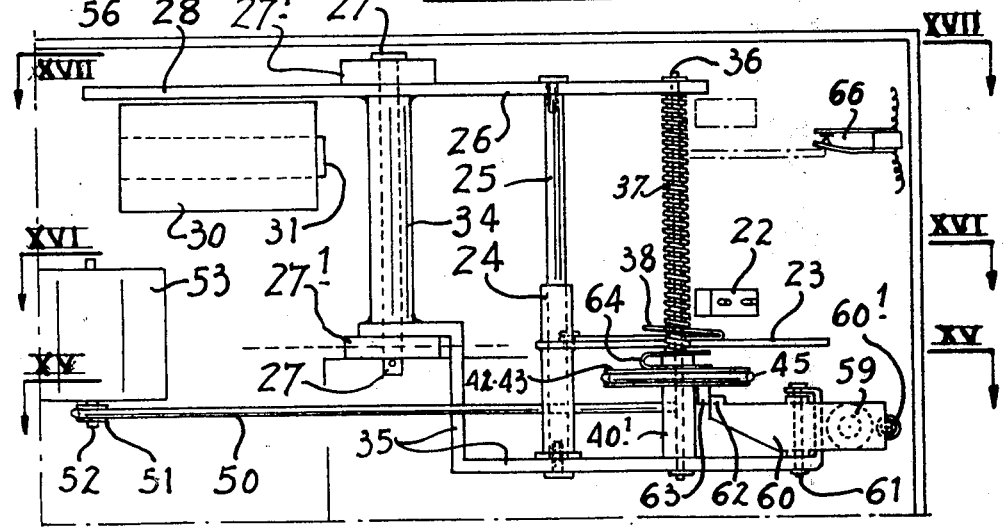

TRANSPARENCY PROJECTOR HAVING A DEVICE TO ALLOW THE PLAYBACK OF SOUND RECORDINGS

The present application is a continuation application of Ser. No. 35,961; filed May 11, 1970, and now abandoned.

The invention relates to an apparatus for use with transparency projectors to allow the playback of individual sound recordings each corresponding to a transparency.

Transparency projectors fed by circular or straight magazines are known.

It is an object of the invention to use simple means to enable the projection of each transparency to be accompanied by the playback of a corresponding individual magnetic recording, so that during the projection of any particular transparency, the user can be quite sure that the recording associated therewith will be played back, while he is also able to change a recording in a series without altering either the order or characteristics of the other recordings.

Another object of the invention is to enable adaptation to commercially available projectors to be carried out without considerable alterations and even to the projector in itself.

Another object of the invention is to avoid interfering with the present features of projectors — i.e., for instance, to make sure that the user can pass from the projection of one transparency to another during the playback of a musical recording, and can start the playback of the other recording without delay due to rewind, re-location time, or the like.

To this end, the apparatus to which the invention relates is mainly characterised in that to correspond with each compartment of the transparency magazine with which the projector is equipped there is disposed a ring or band of magnetisable material, so that when a particular transparency is projected, the individual recording associated therewith can be played back, and a playback and recording apparatus is provided formed by a self-contained element or an assembly which can be integral with the projector or, being detachable, can be fitted thereto, and is so disposed as to drive and read the recording the ring or band associated with the transparency projected at that particular moment.

FIGS. 1–3 show a commercially available transparency projector having a rotary magazine;

FIG. 4 shows the same commercially available projector with the rotary magazine removed;

FIG. 5 shows the magazine according to the invention for the transparencies and corresponding sound recordings;

FIGS. 6 and 7 show a unit containing the mechanism for playback and co-operation with the recorded tapes;

FIG. 8 shows the projector illustrated in FIG. 1 with the magazine illustrated in FIG. 5 attached thereto;

FIGS. 9 and 10 show the projector illustrated in FIG. 1 equipped for the projection and playback of transparencies;

FIGS. 11 and 12 are views, to an enlarged scale, corresponding to FIGS. 9 and 10;

FIGS. 13 and 14 are explanatory views showing the mechanism co-operating with the recorded tapes in the inoperative condition;

FIGS. 15–17 are sectional views, taken along the lines XV—XV, XVI—XVI and XVII—XVII in FIG. 10, the mechanism being in the co-operating condition;

FIGS. 18–23 are details;

Figure 24:
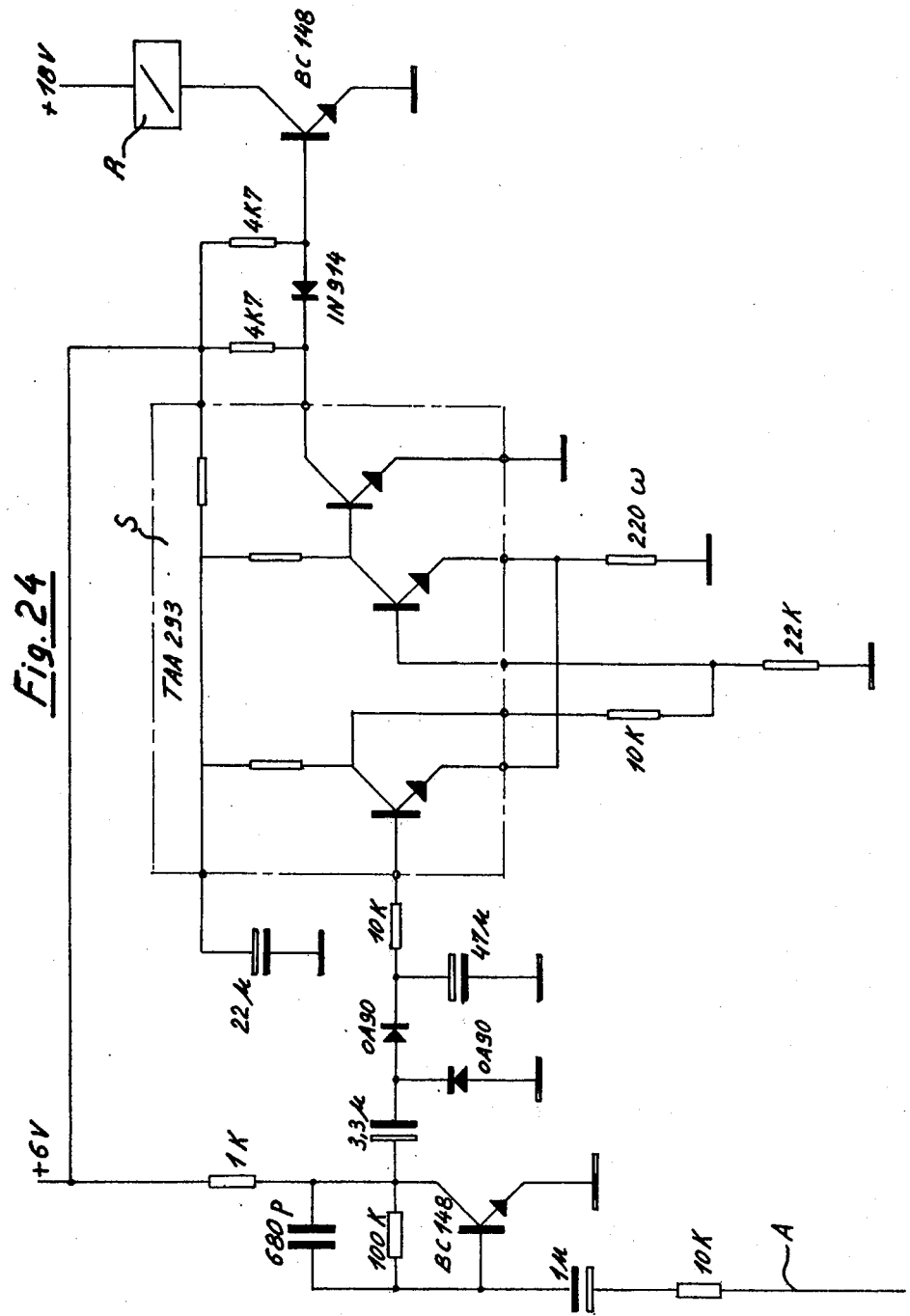
FIG. 24 shows an electronic circuit.

FIGS. 1–3 show a known transparency projector 1 having a detachable circular magazine 2 formed with compartments 3 each receiving a transparency.

The magazine 2 has a control device so devised as to give it by known means a rotary movement by which the transparencies can be projected successively by the projector 1 with objective 4 (FIG. 1).

According to the invention, the transparency magazine 2 has a circular ring 5 (FIG. 5) supporting, to correspond with each transparency compartment 3 and in the continuation of the radius forming the longitudinal axis thereof, a band 6 formed by an endless magnetic tape with spiral recordings; the magnetic tape moves guided, for instance, on the one hand by cylindrical rods 7 (FIGS. 13 and 18) connected to the ring 5 on its upper surface and adjacent the outer edge, and on the other hand by semi-cylinders 8 disposed adjacent the transparency magazine 2.

Towards the top, each band position can be closed by a substantially oblong plate 9 having at each of its ends a stud 10, 11 (FIG. 18) one 10 of which engages in a hole 12 with which the cylindrical rod 7 is axially formed, the other stud 11 extending into a hole 13 with which a round portion 14 terminating the semi-cylinder 8 at the top is formed.

On its inner face, the ring 5 bears (FIGS. 13, 18, 21) a series of projections 15 of substantially triangular section which extend radially over a small distance from the outer edge of the circular ring 5 at a place corresponding to the axis of a transparency compartment 3 (FIG. 13).

A unit 16 (FIGS. 6 and 7), which contains the playback and recording apparatus and in the embodiment illustrated is detachable, is mounted on the projector 1 by a lug 17; the lug 17 has a circular outline on the side of the projector and is formed with a rim 18 for the engagement of the unit 16 on a circular projection 19 forming part of the projector 1. A projection 20 (FIG. 14) with which the circular projection 19 is formed co-operates with a notch 21 with which the lug 17 is formed, so that the unit 16 can always be placed without risk of error in the same predetermined position in relation to the projector.

The playback and recording apparatus comprises a playback head 22 borne by a lever 23 (FIG. 16) having a bush 24 (FIG. 19) by which the lever 23 can slide along a rod 25 attached at its top end (FIG. 19) to a lever 26 which can pivot (FIG. 17) around a pivot 27 attached in supports $27^1$ connected to a wall $16^1$ of the unit 16 and continued beyond such pivot by an arm 28 subjected on the one hand to the action of a spring 29 (FIG. 17) and on the other hand to the action of a release electromagnet 30 whose armature 31 can act on the arm 28 via the agency of a bell crank 32 to which a strip 33 is attached which can act on the arm 28.

An interpolated bush 34 connects the lever 26, 28 (FIG. 19) to a lever 35 which is disposed lower than the lever 26, 28 and to which the lower end of the rod 25 is attached and on which the bush 24 can rest.

Also extending between the arms of the fork 26, 35 is a rod 36 (FIGS. 19 and 22) on which the screw 37 can rotate which controls the driving of the playback head 22 via the agency of a wire hairpin spring 38 (FIG. 16) which is attached at one end to a stud 39 connected to the lever 23; the wire spring is so disposed that in the inoperative state it does not co-operate with the screw 37, but when the electromagnet 30 is energised (FIG. 17) during the closure by one of the projections 15 (FIG. 18) of a switch 65 associated with the electromagnet winding supply circuit, and therefore the assembly 26, 28, 35, has tilted around the pivot 27, the wire spring 38 comes into co-operation with the spring 37 (FIG. 16) so as to enable the playback head 22 to move along the magnetic tape for the playback of the recording.

The screw 37 (FIG. 22) is continued by a sleeve 37$^1$ connected to a plate 40 resting on an interpolated bush 40$^1$; the sleeve 37$^1$ is driven, with the interposition of a friction member 41, by a plate 42 freely rotating on the sleeve 37$^1$ and having a rim 43 formed with a groove 44 adapted to receive a drive belt 45 (FIG. 15) also running over a grooved gearwheel 46 keyed to a spindle 47 which rotates in bearings formed in the arm 26 of the lever 26, 28 and the lever 35 (FIG. 18) and to which a roller 48 driving the recorded tape 6 is attached.

Connected to the gearwheel 46 is a grooved pulley 49 over which a belt 50 runs which is driven by a gearwheel 51 (FIG. 16) keyed to the spindle 52 of a motor 53.

The spindle 47 also bears a flywheel 54.

The invention also provides a detecting device which can be constructed and operates as disclosed in a patent application filed at the same time as the present application.

This device is for use with endless spiral-recording supports, to counteract errors due to the displacement of the head in relation to the spiral track and is characterised in that means are provided for automatically adjusting the position of the playback head in relation to the axis of the recording track, such adjustment being controlled by or dependent on a marker connected to the recording support.

In the embodiment illustrated, a photosensitive cell 55 (FIGS. 18 and 20) is provided co-operating with a lamp 56 and when, during the passage of a reflecting portion 57 forming a marker on the recorded tape 6 opposite the unit 58 borne by the lever 36, the rays of light energise the photosensitive cell 55, it initiates the operation of an electromagnet 59 borne by the lever 35 (FIGS. 15 and 19) and causes the tilting of a lever 60 which can pivot around pivot 61 also borne by the lever 35.

The lever 60 normally subjected at one of its end to the action of a spring 60$^1$ bears at its other end a bent-over portion 62 adapted to co-operate with a stud 63 borne by the plate 40 of the friction clutch (FIG. 22).

A hairpin spring strip 64 (FIG. 22) acts via one arm on the sleeve 37$^1$ connected to the screw 37 and acts by its other arm on the plate 42 to apply the friction member 41 against the plate 40.

The apparatus operates briefly as follows:

When the rotation of the magazine 2 brings a transparency into the projection position, a projection 15 corresponding to the transparency to be projected closes the switch 65 so that, as already explained, the electromagnet 30 is energised (FIG. 17) and its armature 31 acts on the bell crank 32 which, via the agency of the strip 33, tilts the assembly formed by the lever 26, 28 and the lever 35 connected to the lever 26, 28 by the interpolated bush 34.

The playback head 2 borne by the lever 23, the photosensitive unit 58 and the driving roller 48 attached to the spindle 47 are therefore brought into the position for cooperation with the magnetic tape 6.

The magnetic tape 6 corresponding to the transparency projected is put into motion for playback.

when the members move from the position shown in FIG. 13 (non-co-operating position) into the position shown in FIG. 16, the wire spring 38 also borne by the lever 23 is introduced into a hollow in the screw 37; when the playback head 22 comes into contact with the magnetic tape 6, the tilting of the lever 23 bearing the wire spring 38 is locked; however, the lever 26, 35 bearing the screw 37 then performs another slight tilting movement so that the screw 37 and the spring 38 come into the co-operating position.

The screw 37 rotating in principle continuously, the wire spring 38 connected to the lever 23 entrains the latter, and therefore the head 22 in its displacement upwards parallel with the screw 37.

Clearly, since the closure of the switch 65 by a projection 15 produces the energisation of the electromagnet 30 and the tilting of the assembly of the operational elements initiating playback, the playback of a magnetic tape can take place only when the magazine 2 is in the exact position required for the projection of a transparency.

When the playback of the recorded portion of a magnetic tape is completed, the electromagnet 30 is de-energised, since as soon as the transparency magazine 2 starts to rotate to pass on to a following transparency, the corresponding projection 15, having left the axis of the location of the transparency which has just been projected, acts on the switch 65 which cuts off current from the electromagnet 30.

The assembly of levers 26, 28, 35 then subjected to the action of the spring 29 and bearing the operative elements returns the latter into the non-co-operating position (FIG. 13).

Playback end information which gives the projector the order to pass on to the following transparency acts on the projector itself, inasmuch as since the projectors have electric remote controls for passing from one transparency to another, such control can be acted on directly at the end of playback.

Clearly, in the construction disclosed, when the playback head 22 reaches the end of its travel, it can act on a switch 66 which can act directly on the projector.

In a further improved variant, the information to pass on to a following tansparency can be determined by the end of playback, not the end of travel of the head.

In this case, the information given to the projector to pass on to a following transparency appears only after about, for instance, 2 seconds silence following the end of playback.

To this end an electronic assembly is provided which is adapted to differentiate between a recording period and a period of silence (FIG. 24).

The reference A denotes the input of a signal coming from the playback head amplifier.

A capacitor B remains charged as long as recording are present.

As soon as a silence takes place, the capacitor B discharges, and about two seconds after it has discharged it acts on a circuit controlling a relay R which feeds the information to the projector to pass on to the following transparency.

The circuit diagrammatically illustrated in FIG. 24 can be understood as it stands, both as regards its arrangement, the co-operation between its elements and its operation for an electromagnet.

During the tilting of the levers out of the position shown in FIG. 16 into that shown in FIG. 13, the lever 23 follows the lever 26, 35 with a slight delay and therefore the wire spring 38 is then released from the screw 37; the lever 23 bearing the head 22 then slides downwards by gravity via the bush 24, along the rod 25, and the whole assembly is returned to the starting position.

If for any reason the projection of a transparency and the playback of a recording must be interrupted, it is enough to actuate the mechanism controlling the withdrawal of the transparency from its projection position and the rotation of the magazine to produce the projection of a different transparency and also the playback of the corresponding band.

As soon as the magazine has started to rotate, the projection 15 ceases to keep the switch 65 closed; the electromagnet 30 is de-energised and the assembly is returned into the non-co-operating position, while the head 22 has descended into its starting position.

As it continues to rotate, the magazine 2 is brought into a position in which the following transparency will be brought into the projection position and when the magazine has arrived exactly at such position, the projection 15 associated therewith will close the switch 65 and the whole mechanism will be returned into the co-operating position for the playback of the magnetic tape corresponding to the fresh transparency projected.

Clearly, the various devices can be used unaltered for a projector having a straight magazine, instead of a circular one.

The operations and movement according to the invention remain basically unchanged.

What I claim is:

1. In an automatic sound transparency slide projector, in combination; a compartmented transparency-supporting magazine for holding the transparencies radially arranged about a central axis; a control device adapted to provide a rotary movement by which the transparencies are successively projected by the projector; a ring on said magazine; a radially extending band supported on said ring in coaxial alignment with each transparency compartment and being disposed at the outer radii of the transparency compartments, said band being an endless magnetic recording tape located so that upon a given transparency being projected a corresponding associated recording on said tape is located in a playback position; a unit comprising a playback and recording apparatus being mounted on said projector for driving and reading the recording tape associated with the transparency being projected at any particular time intervals; projections on the outer edge of said ring in positions corresponding respectively to the axis of the transparency compartment; a solenoid including a circuit; switching means in said circuit of the solenoid; a mechanical connection extending between the armature of the solenoid and a playback head on said playback and recording apparatus whereby, when the solenoid is energised during the closure of said switch by one of the projections, the playback head is permitted to move into a position to start the playback.

2. A transparency projector according to claim 1 in which said unit comprising said playback and recording apparatus is detachably mounted on the projector.

3. A transparency projector according to claim 1, a first lever supporting said playback head and having a bushing, a rod extending through said bushing along which said lever is adapted to slide, a second lever being attached to said rod at the upper end of said rod, said second lever being tiltable about a pivot, said rod having an extending arm beyond the pivot, said solenoid including a release electromagnet actuating said arm upon being energised during closure of said switch by one of the projections of the ring, a bell-crank and an element attached to the arm of said second lever, said release electromagnet having an armature actuating said second lever through said bell crank and element, a third lever connected to said second lever and disposed at a lower level so as to form a fork therewith, a second rod extending between the arms of said fork, a rotatable control screw on said second rod for controlling the driving of the playback head through a spring, said second rod being attached at one end to the lever bearing the playback head, so that in the inoperative condition the spring does not co-operate with the screw, whereas when the electromagnet is energized during the closure of the switch by one of the projections of the circular ring of the magazine and the lever co-operating with the electromagnet tilts, the spring co-operates with the screw so as to move the head opposite the recording for playback thereof.

4. A device according to claim 3, said control screw including a sleeve extension, a plate being connected to said sleeve extension and supported on an interpolated bush, a further plate freely rotating on the sleeve, a drive belt rotating said further plate through a friction member, a gear wheel having said belt extending thereover, a spindle keyed to said gear wheel, a roller attached to the spindle for driving the recording tape, and a motor having a transmission for moving said gear wheel.

5. A device according to claim 1, comprising a detecting device for counteracting errors due to movement of the head in relation to a spiral recording track, said device comprising means for automatically adjusting the position of the playback head in relation to a theoretical axis of the recording track, and a marker providing for adjustment connected to the recording support.

6. A device according to claim 5, comprising a photosensitive unit, said roller for driving the magnetic tape and said photosensitive unit being cooperatively engaged with the magnetic recording tape corresponding to the transparency projected so as to impart motion to the tape for playback in such a manner that, when the rotation of the transparency magazine has brought a particular transparency into the projection position, the corresponding projection provided on the ring having the transparency magazine being adapted to close the switch of the circuit of the electromagnet amd the armature thereof being actuated to tilt the lever supporting the playback head.

7. A device according to claim 6, comprising means which, when the playback head is brought into contact with the magnetic tape, locks against further tilting of the lever bearing the playback head, the lever bearing the driving screw having a further slight tilting movement imparted thereto so that the screw and the spring move into a cooperative position, and the spring being connected to the lever supporting the playback head for entraining the lever and the head in its displacement.

8. A device according to claim 7, the information to pass on to a following transparency being determined by the end of travel of the head.

9. A device according to claim 8, comprising a limit switch adapted to actuate the projector to pass to a successive transparency, said switch being actuated by the playback head when the playback of the recorded portion of the tape has been completed and the release electromagnet has been de-energised.

10. A device according to claim 8, the information given to the projector to pass on to a following transparency being determined by the end of playback.

11. A device according to claim 10, comprising an electronic assembly adapted to differentiate between a recording period and a period of silence.

12. A device according to claim 10, said electronic assembly comprising an input of a signal emitted from the playback head amplifier, and a capacitor which remains charged during periods of recordings, and upon silence intervals, the capacitor discharges whereby, after an interval of time, the capacitor reaches a value which actuates a circuit controlling a relay for sending information to the projector to pass on to a successive transparency.

* * * * *